(12) United States Patent
Shahpar et al.

(10) Patent No.: US 9,123,166 B2
(45) Date of Patent: Sep. 1, 2015

(54) METHOD OF CONNECTING MESHES

(75) Inventors: Shahrokh Shahpar, Derby (GB); Ning Qin, Sheffield (GB); Yibin Wang, Sheffield (GB); Greg Carnie, Aberdeenshire (GB)

(73) Assignee: ROLLS-ROYCE plc, London (GB)

( * ) Notice: Subject to any disclaimer, the term of this patent is extended or adjusted under 35 U.S.C. 154(b) by 344 days.

(21) Appl. No.: 13/358,077

(22) Filed: Jan. 25, 2012

(65) Prior Publication Data

US 2012/0203512 A1 Aug. 9, 2012

(30) Foreign Application Priority Data

Feb. 3, 2011 (GB) .................................. 1101810.8

(51) Int. Cl.
*G06F 17/50* (2006.01)
*G06T 17/20* (2006.01)

(52) U.S. Cl.
CPC ...................................... *G06T 17/20* (2013.01)

(58) Field of Classification Search
CPC ....... G06T 17/20; G06T 17/00; G06T 17/205; G06T 17/10; G06T 19/00; G06T 17/05; G06T 19/01; G06T 19/20; G06T 15/04; G06T 7/0012; G06T 17/30; Y02T 10/82
USPC .......................................................... 703/1, 2
See application file for complete search history.

(56) References Cited

U.S. PATENT DOCUMENTS

| | | | |
|---|---|---|---|
| 5,768,156 A * | 6/1998 | Tautges et al. ..................... | 703/2 |
| 6,560,570 B1 * | 5/2003 | Dohrmann et al. ................ | 703/7 |
| 7,219,039 B1 * | 5/2007 | Shepherd et al. .................. | 703/2 |
| 7,698,112 B2 * | 4/2010 | Fischer et al. .................... | 703/2 |
| 8,390,620 B1 * | 3/2013 | Staten et al. ................... | 345/423 |
| 2009/0112527 A1 * | 4/2009 | Ordonez et al. .................. | 703/1 |
| 2011/0298802 A1 * | 12/2011 | Whitaker et al. ............. | 345/423 |

FOREIGN PATENT DOCUMENTS

WO WO 2009/053451 A1 4/2009

OTHER PUBLICATIONS

Golias et al. ("Delaunay triangulation and 3D adaptive mesh generation", Elsevier Science B.V, 1997, pp. 331-341).*
J. A. Sethian ("A fast marching level set method for monotonically advancing fronts", Natl. Acad. Sci. USA vol. 93, Feb. 1996), pp. 1591-1595).*
Turk et al. (Zippered Polygon Meshes from Range Images, 1994, ACM, pp. 1-8).*

(Continued)

*Primary Examiner* — Omar Fernandez Rivas
*Assistant Examiner* — Iftekhar Khan
(74) *Attorney, Agent, or Firm* — Oliff PLC

(57) ABSTRACT

A method of connecting three-dimensional structured meshes to form a conformal mesh, for solutions of flow problems, including: forming an interface by overlaying surfaces of two structured meshes; defining an interface set of mesh points in the interface; merging mesh points in the interface set that are within a predetermined distance of each other and projecting mesh points of one mesh in the interface that are within a predetermined distance of a line of the other mesh; generating an interface layer in the form of an unstructured mesh; and inserting a node at the center of each hexahedra, and producing an unstructured layer of cells between the two structured meshes by joining the nodes to the mesh points of the interface layer.

17 Claims, 8 Drawing Sheets

(56) References Cited

OTHER PUBLICATIONS

Jonathan Richard Shewchuk (Delaunay refinement algorithms for triangular mesh generation, 2001, Elsevier Science B.V., pp. 21-74).*

Marras et al.; "Controlled and Adaptive Mesh Zippering;" *GRAPP 2010—International Conference on Computer Graphics Theory and Applications;* 2010; pp. 104-109; http://ugo.sc.unica.it/papers/Marras2010CAM.pdf.

Benek et al.; "A 3-D Chimera Grid Embedding Technique;" *AIAA Paper* 85-1523; 1985 pp. 322-331.

Zheng et al., "A novel approach of three-dimensional hybrid grid methodology: Part 1. Grid generation;" *Comput. Methods Appl. Mech. Engrg.;* 2003; pp. 4147-4171; vol. 192.

Qin et al.; "Buffer Layer Method for Linking Two Non-Matching Multi-block Structured Grids;" $47^{th}$ *AIAA Aerospace Sciences Meeting Including the New Horizons Forum and Aerospace Exposition;* 2009; pp. 14; Orlando, Florida.

British Search Report dated Jun. 13, 2011 in British Patent Application No. 1101810.8.

* cited by examiner

METHOD OF CONNECTING MESHES

This invention is concerned with the construction of meshes for components used in computational applications such as computational fluid dynamics (CFD) or finite element analysis, and has particular application to techniques that allow multi-block structured meshes to be joined (pasted) together. Examples would be generation of suitable meshes for turbomachinery fluid dynamic applications, such as for rotor blades and aerodynamic parts.

In order to produce meshes for complex geometry for simulation, e.g. for CFD, multi-blocks are often used to divide the domain into simpler domains. However, for many complicated geometries, the multi-block topology is very difficult or even impossible to generate.

One strategy is to generate different multi-blocks for different components or groups of components, and then to link them together. The problem then presents itself of how to join the different multi-blocks, since their nodes will not in general coincide, owing for instance to different local mesh sizes and configurations. A particular problem in the field of turbomachines is the small gaps involved, something which the prior art does not adequately address.

Multi-block 3D meshes can be joined up using a non-matching interface (non-conformal mesh) approach; this requires interpolation of flow properties and/or fluxes between the meshes at the non-matching interface. The multi-block meshes can be made and the grid interface generated with Rolls-Royce's proprietary "Hydra" sliding-plane algorithm. An illustration of the process is shown for a blade and groove in FIG. 1. There is also commercial software that allows for a non-matching plane to be generated between two existing multi-block meshes. This can be used with or without a one-cell overlap as long as the two different meshes lie on the same plane. It can also handle both conformal and non-conformal meshes.

The Chimera mesh technique (Benek, J. A., Buning, P. G. and Steger, J. L., "A 3-D Chimera Grid Embedding Technique", AIAA Paper 85-1523, July 1985) allows overlaps of structured blocks for handling complexity by breaking up the model into a series of "meshable" regions which are over-lapped. However, it also suffers accuracy reduction due to interpolation errors and loss of conservation property.

A "structured mesh" is one in which the grid or mesh points are connected in 2D or 3D in a regular manner such that the neighbours of every point can easily be found by the indices, i, j, and k in 3D. For instance, for mesh points A-B-C in the x direction, then C is i+1 and A is i−1 if B has an index of i, and similarly in the j and k directions. Hence, there is no need for a connectivity or look-up table to identify points in relation to other points, and all the edges, surfaces and cells can easily be identified. On the other hand, for "unstructured" meshes, connectivity or look-up tables are needed to "relate" a node to all its neighbours.

To avoid the problems related to the Chimera technique, non-structured grids have been proposed and have been extended to three-dimensional complicated geometries—see Zheng, Y. and Liou, M-S, "A novel approach of three dimensional hybrid grid methodology: Part 1. Grid generation Computer Methods", Applied Mechanics and Engineering, Volume 192, Issues 37-38, pp. 4147-4171, 12 Sep. 2003. An element of such approaches is the generation of the unstructured mesh between the structured blocks.

Commercial meshing tools are used to define the blocks interactively using the multi-block structural approach, forcing the meshes to be continuous across different topologies. There are many sophisticated meshing packages commercially available that offer the capability to create volume or surface meshes parametrically from geometry or mesh in multi-block structured or unstructured hexahedral, Cartesian, tetrahedral-prism, hexa hybrid and unstructured quad/tri shell formats.

One can also make use of fully unstructured meshes, e.g. Delaunay triangulation (or tetrahedral in 3D) or by making use of quad-tree techniques, to produce an unstructured hex mesh.

Buffer layers based on unstructured techniques can be used to fill in the gap between two or more sets of multi-blocks automatically using pyramids, prisms and tetrahedra (tets), forming unstructured mesh layers, as set out by Qin, N., Carnie, G., LeMoigne, A., Liu X., Shahpar, S., "Buffer Layer Method for Linking Two Non-Matching Multi-block Structured Grids", 47th AIAA Aerospace Sciences Meeting Including The New Horizons Forum and Aerospace Exposition, 5-8 Jan. 2009, Orlando, Fla., AIAA-2009-1361. However, this can lead to elements of poor quality when used in regions where the original hexahedral mesh size is relatively small or of very high aspect ratio, such as in a tip gap of a rotor.

One may also consult WO 2009/053451 (Airbus España/ Mora Ordoñez et al.), which shows a way of eliminating irregular blocks or cells by decomposing them into regular cells, at the cost of creating hanging nodes.

For practical engineering applications of computational fluid dynamics, e.g. flows around aircraft and inside a gas turbine engine, multi-block structured meshes are preferred for numerical accuracy (less numerical dissipation) and computational efficiency (data operation and storage).

A major problem for multi-block structural meshes is the difficulty in mesh generation for complicated geometries and the long time spent by the engineers in generating appropriate multi-block topologies. The generation of the multi-block structures can be very time-consuming and sometimes impossible.

Non-matching interfaces may be introduced to connect different multi-block meshes. However, interpolating solutions (fluxes) from adjacent grids is prone to extra numerical errors. Experience indicates this could add artificial "losses" or entropy generation to the system. More importantly, the non-matching surface approach destroys the "conservative" property of the finite-volume method (in most CFD solvers), which can result in problems in the accurate prediction of flow phenomena such as shock strength and position.

Concerns about the Chimera mesh technique include the errors introduced due to the interpolation between dissimilar overlapped meshes and the non-conservative property of such a treatment. Techniques that make use of a Delaunay unstructured mesh generation can easily be accomplished between the two structured meshes in 2D. However, in 3D, since the original structured mesh surfaces after triangulation do not necessarily satisfy the Delaunay criterion, a direct application of the unstructured mesh generation based on the Delaunay principle is no longer applicable. Zheng and Liou therefore adopted a sophisticated approach to achieve unstructured mesh generation in between the structured blocks, based on the Delaunay principle. The surfaces of the unstructured meshes match those of the bounding structured ones. However, this approach means that hanging nodes are necessary. This in turn necessitates the interpolation of solutions for these hanging nodes, which is computationally inefficient and introduces errors.

For some cases, a matching multi-block mesh may be generated through labour-intensive block topology generation. However, it is very time-consuming and cannot easily be automated.

In addition, this approach can result in excessive mesh resolution in non-critical regions, purely due to the extension of the necessary refined mesh regions.

Meshing software can also be used to link conformal or non-conformal meshes together; however, one cannot join two structured meshes together in a very thin region. One can join a structured mesh to an unstructured mesh. This is achieved by adding in a layer of pyramids onto the last layer of hexahedral cells (of the structured mesh) and then tets everywhere else. Some meshing software can also connect hexahedral cells to tetrahedral cells via pyramids.

A fully unstructured mesh, although it can be automated and is not processor-intensive, cannot produce the desirable mesh in the vicinity of the solid walls. Here an ideal mesh would be a body-fitted high-aspect-ratio hex mesh, both for the boundary-layer capture as well as a "minimum-energy" mesh for a general simulation of the flow.

Buffer-layer techniques suffer from limited numerical accuracy in mixing high-aspect-ratio pyramids, prisms and tets for a very limited meshing domain, e.g. in a very thin tip gap.

The invention addresses the current problems mentioned above and is defined in the appended claims.

Embodiments of the invention provide a way of linking two multi-block structured meshes, the zipper layer itself being made of unstructured meshes. Each block comprises a set of structured mesh points, and the "zipper layer" contains a single layer of mesh points from each block, adjusted as necessary in the plane, and two single layers of intermediate mesh points, one on each side of this interface layer, ensuring that there are no hanging nodes.

Methods using the invention comprise the steps of:
forming an interface surface by overlaying the surfaces of two multi-block meshes;
identifying mesh points in the interface that are contained by at least one of the two side surface meshes; these mesh points will include both sets of mesh points (nodes) and also the intersections of mesh lines;
identifying mesh points in the interface that correspond to each other closely enough, according to a predetermined criterion, relative to the mesh sizes, and merging these mesh points when necessary;
identifying mesh points in the interface that are close enough, according to a predetermined criterion, to the lines of the other mesh; projecting these mesh points when necessary, to the corresponding mesh line;
generating an interface layer in the form of an unstructured mesh formed of triangles and quadrilaterals including all the mesh points from both surfaces and the intersection points; and
inserting nodes at the centres of the resulting hexahedra which need splitting, and producing an unstructured double layer of cells between the two blocks by joining the nodes to the interface layer so as to form tetrahedra and pyramids, possibly with some hexahedra.

The predetermined criterion or amount may be, say, that the distance between the nearly-aligned points is less than a fixed proportion of the smaller mesh; it may be adjustable by the user as a parameter. Typically, it might be perhaps 5-25%, possibly around 10% of the (smaller) mesh size. The amount might be chosen after doing a minimum/maximum search over the meshes.

This method minimises the extent of the unstructured layer, and in particular eliminates the undesirable high-aspect-ratio tetrahedra of the prior-art buffer layers. Because of its feature of locally stretching the meshes to force alignment of promising grid points, it can be said to introduce a "zipper layer" to link multi-block structured meshes of different topologies, because it functions like a "zipper" to bring together two multi-block meshes.

For a better understanding of the invention, embodiments of it will now be described, by way of example, with reference to the accompanying drawings, in which.

The Zipper Layer Method of the invention, for connecting two meshes, preferably themselves multi-block meshes, will now be described. It can be divided into the following steps:

(1) Identify the Interface of the Two Multi-Block Meshes

The procedure is explained with reference to an example mesh, FIG. 2. In this Figure, there are two meshes, 1 and 2 (2D view) each with a different topology. Mesh 1 is defined by the diagonal lines and Mesh 2 is defined by the vertical and horizontal lines. These are the lower surface of one block and the upper surface of the adjacent block. They are shown as square grids for simplicity but in a real situation would of course have a varying shape.

Initially a node or mesh point is selected to start constructing the interface mesh; this can be from either Mesh 1 or Mesh 2. For example, if the node selected is from Mesh 1 then a brute-force search is performed to determine in which cell in Mesh 2 it lies. This then gives one a first seed node. For clarity of definition, the "seed node" here refers to the node from Mesh 1, and the "first seed cell" refers to the cell in which it lies in Mesh 2, FIG. 2(a). This is the only time that a brute-force search is required.

Figure 1:
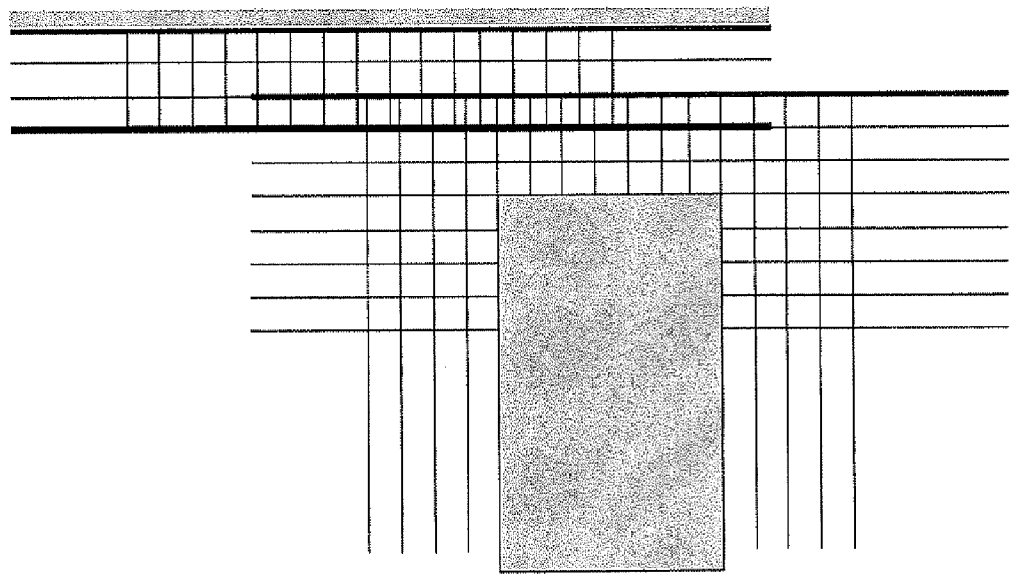
FIG. 1 shows an example of a known mesh linking process.
Figure 2A:
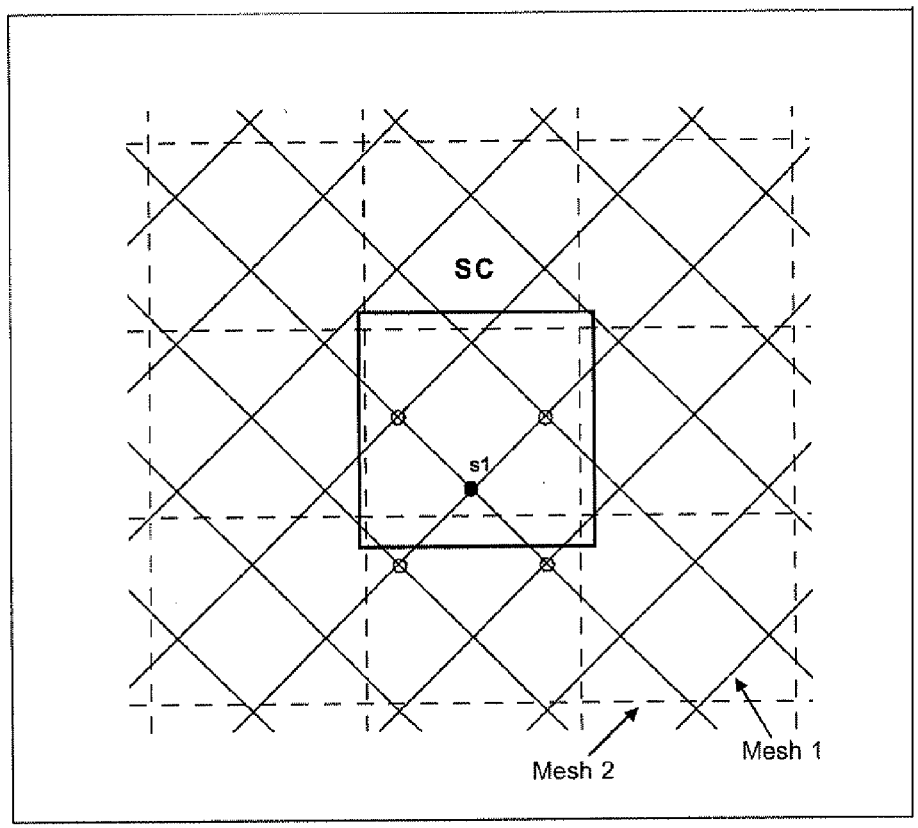
FIG. 2 shows a dual fast march method search scheme used in an embodiment of the invention.
Figure 2B:
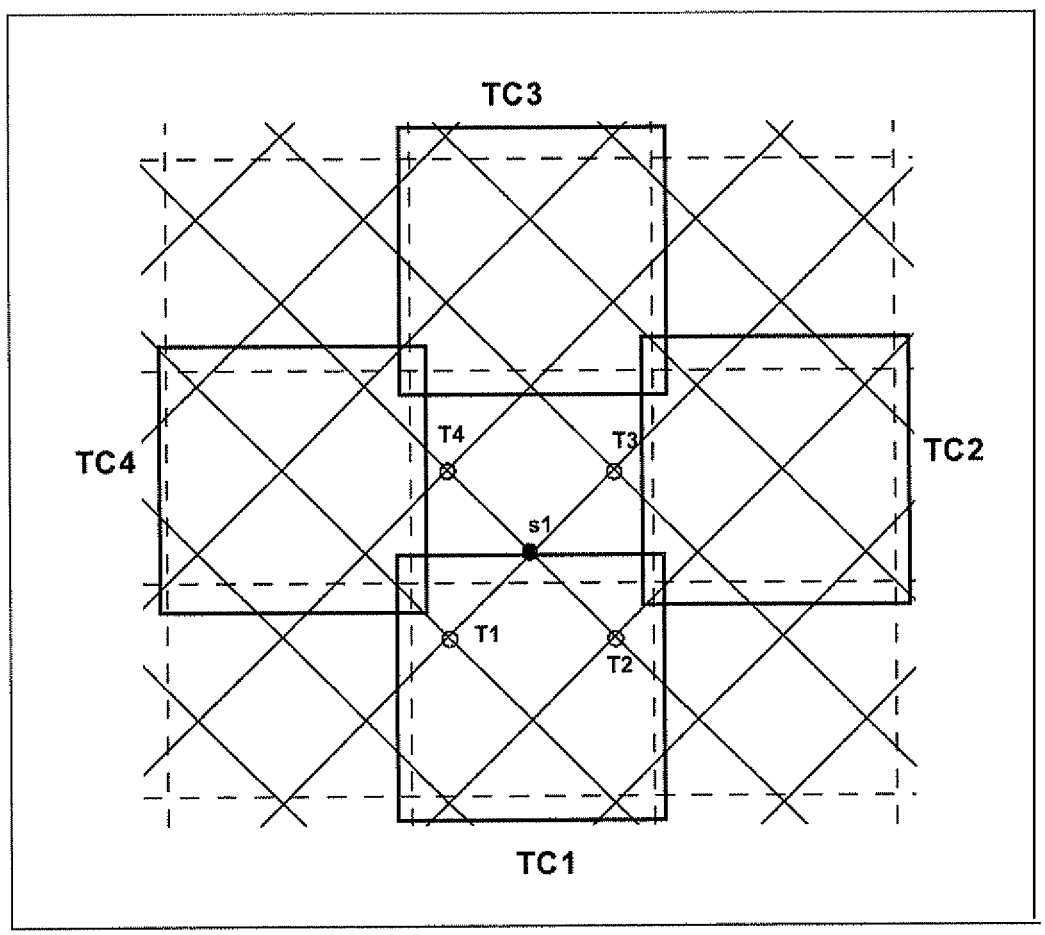
Figure 2C:
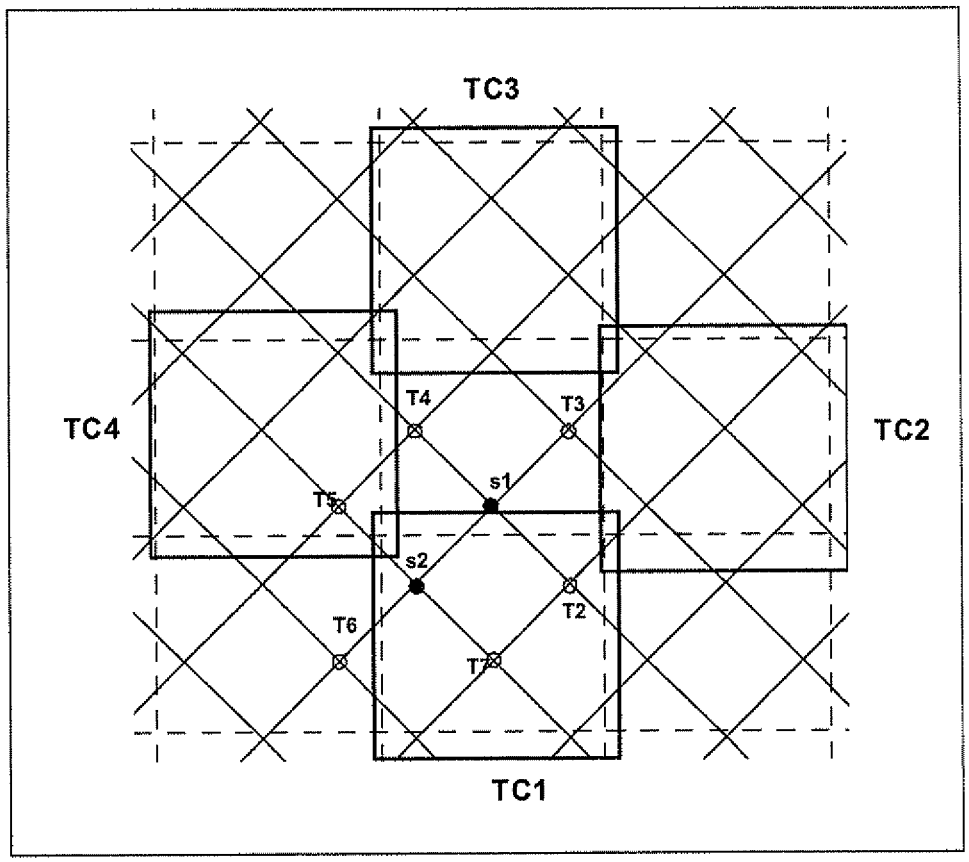

Thereafter, a dual fast march method, which is developed from the Sethian fast march method, is applied to quickly locate the nodes of mesh 1 and mesh 2. The dual fast march method search is quicker than a brute-force search as it only searches the local nearby cells. The original fast-march method algorithm was designed to search a single mesh only, whereas now the dual fast march method algorithm searches two meshes. The steps below outline the process of the dual fast march method:

(a). Find out the position of the selected first node in mesh 1 by going through all the cells, then set this node as the seed node S1 and the corresponding cell of mesh 2 as the seed cell SC, as shown in FIG. 2(a), This step is performed only once to find an initial node to start the dual fast march method. It can be begun from a boundary mesh node point;

(b). Set the nodes neighbouring the seed node S1 as trial nodes $T_1 \ldots T_4$, and the cells of mesh 2 neighbouring the seed cell SC as trial cells $TC_1 \ldots TC_4$, FIG. 2(b); the first seed cell SC in this case has four neighbouring cells (i.e. adjacent at least one edge);

(c). Choose one trial node T, and check whether the trial node is in the seed cell or the trial cells. If the node (e.g. $T_3$) is in the seed cell then set this as a new seed node $S_2$ and go to step (b); if the node (e.g. $T_1$) is in one of the trial cells then set this as a new seed node $S_2$ and go to step (b), as shown in FIG. 2(c); if the node is not in the trial cells (e.g. $T_6$ in due course), set the trial cell's neighbouring cells as new trial cells and do the checking to determine if the trial node is located within those cells;

(d). Stop the procedure when all the nodes from diagonal Mesh 1 have found their location in orthogonal Mesh 2.

(2) Find Intersection Points of the Two Surface Mesh Edges

Figure 3:
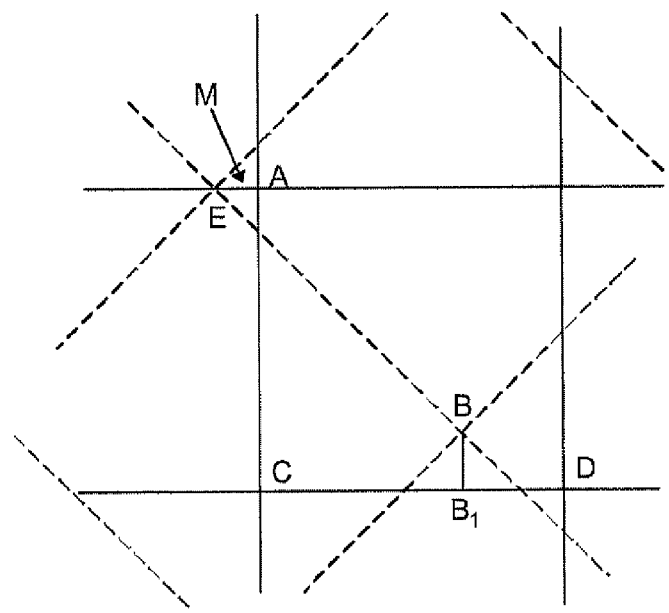
FIG. 3 shows the node movement scheme employed by a zipper algorithm embodying the invention.

In previous methods, an interface layer would be generated using all the intersection points and nodes. In the invention, in order to maintain the mesh quality, node movement is adopted before the triangles on the interface are generated. As shown in FIG. 3, node B in Mesh 1 is near edge CD in Mesh 2 so it is moved towards the edge, by being projected along a line perpendicular to this edge, in order to make the edge CD become $CB_1D$. This eliminates the small triangle that would otherwise be generated in the next procedure. Also, when two nodes are very close to each other, like node A in Mesh 2 and node E in Mesh 1, they are collapsed to their mid-points M to make the small cell disappear. This process creates only a slight distortion of the hexahedra of the two blocks.

(3) Generate an Unstructured Surface (Interface) Mesh

Figure 4:
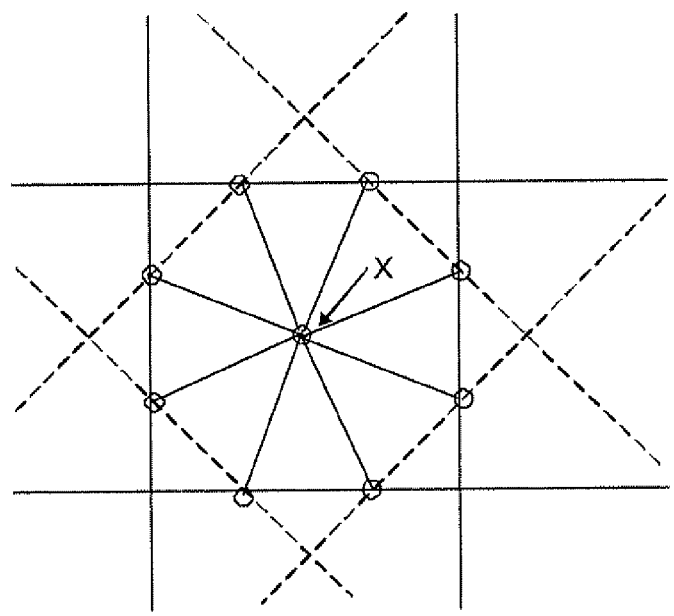
FIG. 4 shows triangulation of the polygon.
Figure 5A:
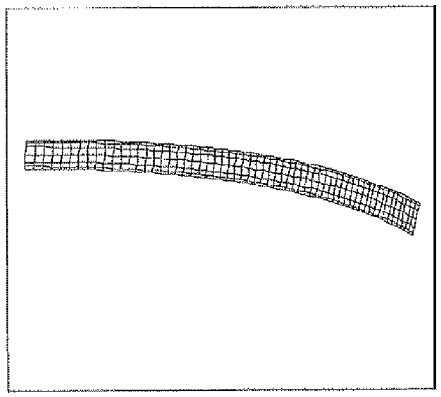
FIG. 5 shows an interface mesh as an example of the 2-D result.
Figure 5B:
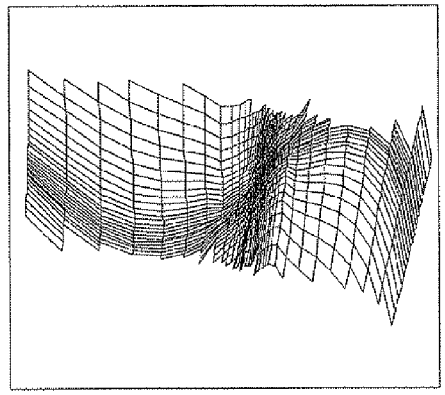
Figure 5C:
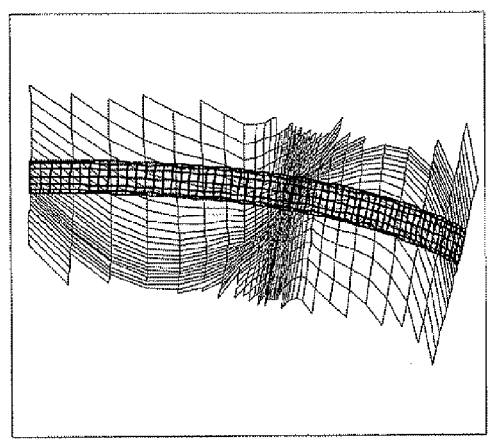
Figure 5D:
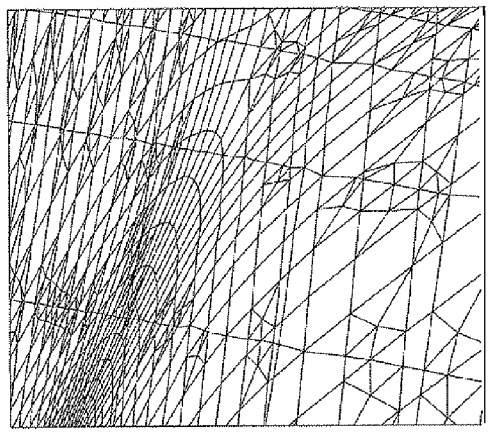

For a typical case, most of the edges of the meshes 1 and 2 will be split by the intersection nodes. As shown in FIG. 4, the four edges of the mesh 2 cell shown are split by intersections with the other mesh 1. The interface mesh is generated by the newly generated edges and any original edges which have not been split. In some cases, the polygons formed will have more than four sides; these must be reduced to three- and four-sided shapes.

In FIG. 4, the triangulation method is: first find a polygon which has more than four edges, in this example an octagon; then insert a point X into the geometric centre of the polygon; and link the point with the two end nodes of each edge of the polygon to form triangles. The polygon can be found by looping the intersection of four edges of the original unsplit cells. The resulting interface is formed from triangles and quadrilaterals and includes all the mesh points from both sides and the intersection points.

A real-life case showing two different mesh topologies with their resulting interface mesh is shown in FIG. 5. FIG. 5(a) is the surface mesh of the upper block, FIG. 5(b) of the lower block, FIG. 5(c) the superposition and FIG. 5(d) a close-up view looking down on the resultant interface layer of cells. Here "patches" of triangular cells can be seen.

(4) Inserting nodes at the Centres of the Hexahedra That Need Splitting

All the nodes in the resulting interface layer need to be joined to the nodes of the blocks. To do this, nodes are inserted at the geometrical centres of the hexahedra, if needed. This is done on both sides of the interface (again, if needed), and then unstructured finite volume cells are generated on both sides of the interface by connecting the centre nodes to the interface mesh. This generates tetrahedra and pyramids, and usually also hexahedra.

The zipper layer approach adopts a cell-splitting method similar to that used in the buffer-layer method. The difference is that in the buffer-layer method points are only introduced into each zone, while in the zipper-layer method points are introduced into each split cell. A zone in this case refers to a small region that encapsulates several surface mesh points from the different multi-block meshes.

Figure 6:
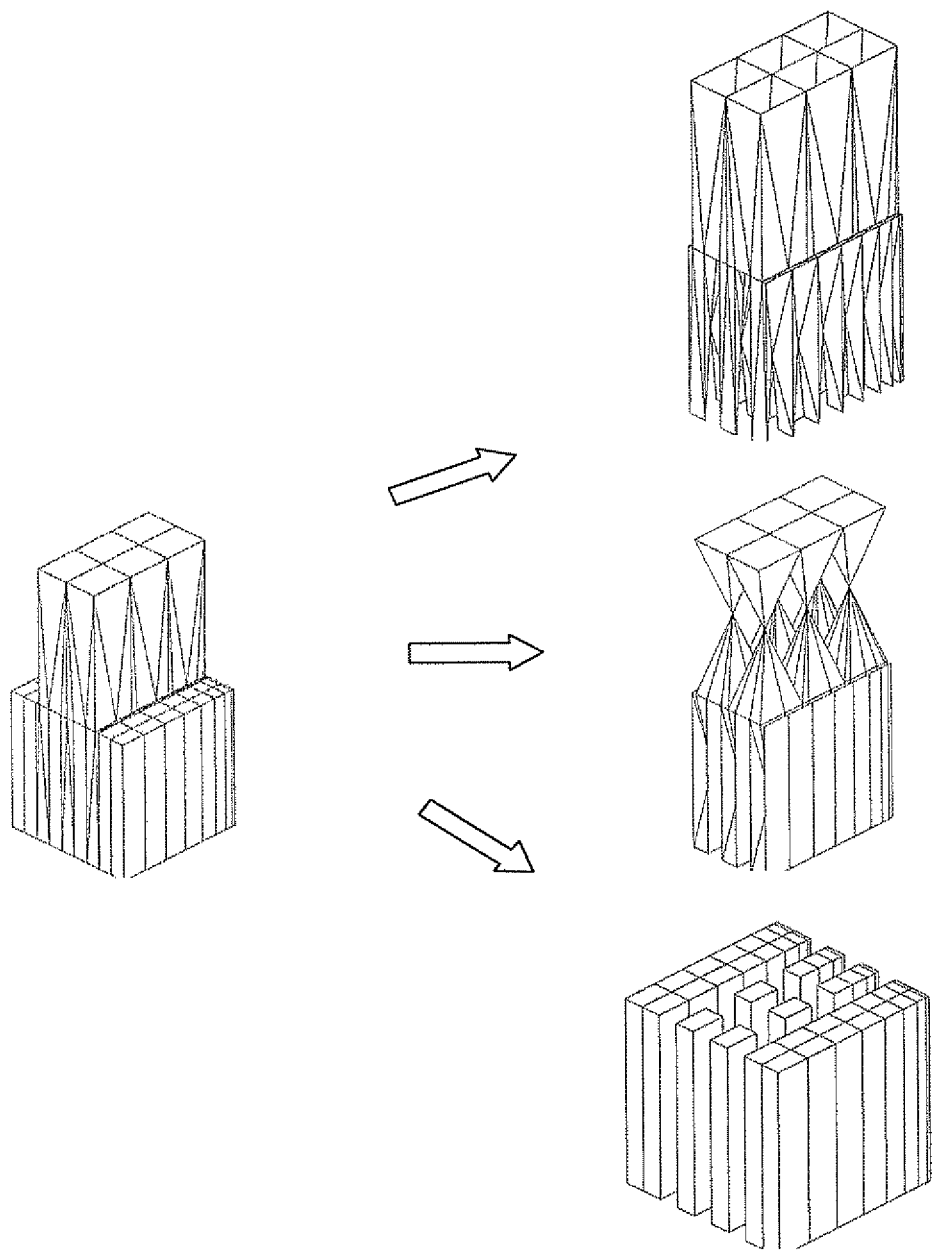
FIG. 6 shows the succeeding volume mesh generation scheme.

The general method is shown in FIG. 6. First, insert a point into the geometric centre of the hexahedral cell to be split. Next, link the inserted point with the triangles and quads on the interface mesh to form tetrahedra and/or pyramids. These can be seen both above and below the interface mesh.

Figure 7A:
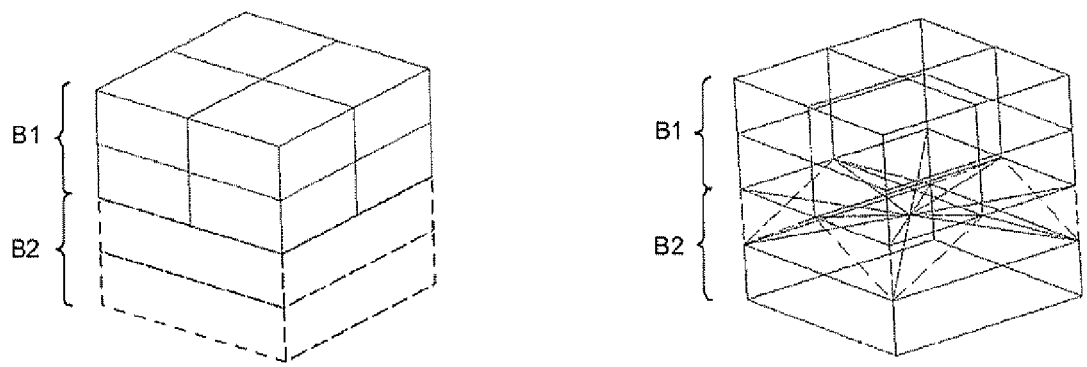
FIG. 7 shows two different structured meshes connected via a zipper layer mesh.
Figure 7B:
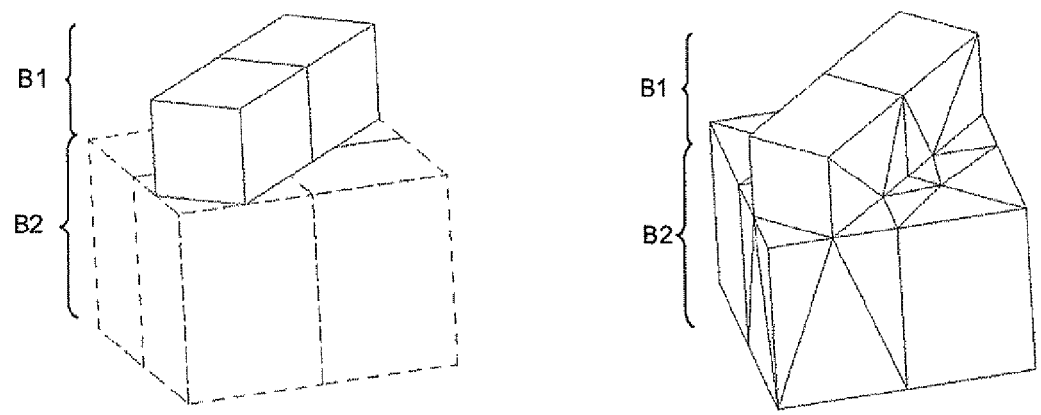

Further examples of the zipper-layer algorithm are demonstrated on differing mesh topologies in FIG. 7 and FIG. 8. FIG. 7 shows two different block topologies and orientations with the resulting 3D cells. FIG. 7(a) is a simple case where the blocks B1, B2 are aligned and one mesh size is a multiple of the other. As shown, pyramids are formed in the lower (coarser) block B2. In FIG. 7(b) the meshes are not aligned, and a part of the 2-D interface mesh can be seen, along with a representative node in the centre of the nearer left-hand hexahedron in the lower block. Some, but for clarity not all, of the polyhedral edges are also drawn in as examples. It can be seen that all the tetrahedra and pyramids are of adequate cell quality: ideally, cells should have orthogonal lines, i.e. sides approaching 90°; below say 5°, or in some cases 10°, the cell quality decreases noticeably. (For triangular faces the ideal figure is of course 60°.) Also, the aspect ratio should be close to 1 outside the boundary layers (where high aspect ratios are inevitable). Further, large or abrupt changes in the cell volumes in neighbouring cells should avoided.

Figure 8A:
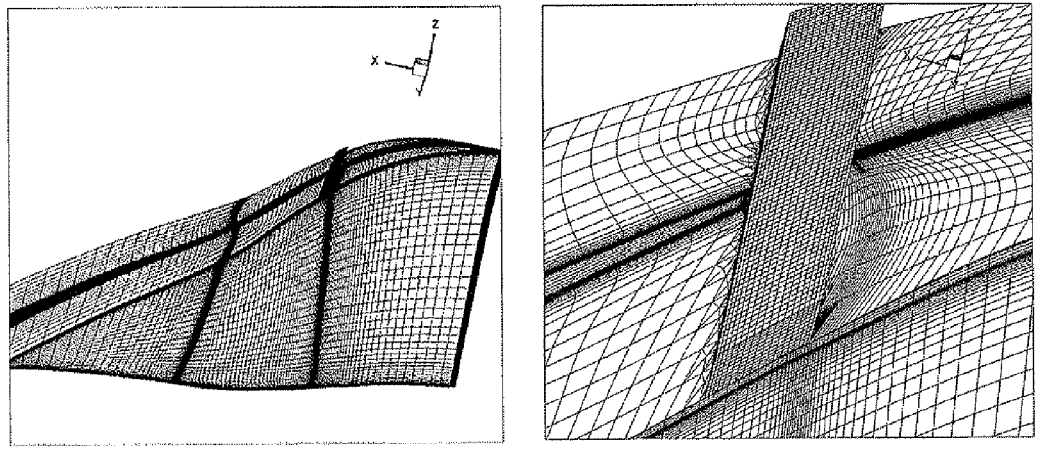
FIG. 8 shows (a) a local zipper layer mesh applied to a groove-casing model and (b) a global zipper layer mesh applied to the groove-casing model.
Figure 8B:
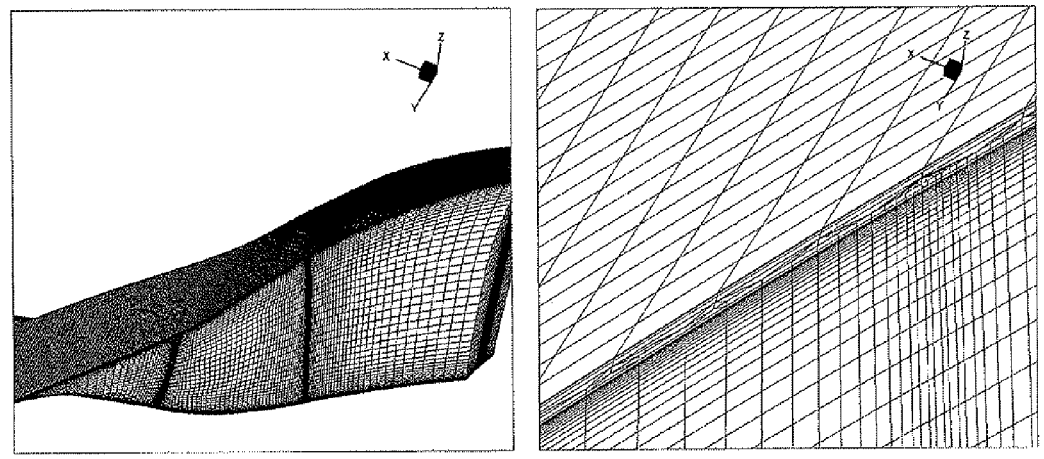

FIG. 8 shows a practical demonstration of the zipper layer algorithm on an industrial test case known as "NASA rotor 37". Here two different applications are shown where the zipper layer has been applied to (a) a local refined area of the machine casing, i.e. around the groove where the tip passes, and (b) the entire machine casing. Thus, FIG. 8(a) shows a local zipper layer, that is, the zipper layer has been applied to connect the single groove (square mesh) to the original rotor multi-block mesh. In this instance one obtains unstructured cells (triangle faces) on the casing. FIG. 8(b) is a global zipper layer where a new mesh block is placed over the entire casing, so that the casing surface consists of completely structured cells (quad faces).

Distinctive features are:
(i) The multi-block meshes are connected (zippered together) by matching mesh surfaces so that no solution by interpolation is required;
(ii) The method is numerically "conservative", an important feature for accurate flow solutions;
(iii) The zipper layer method does not depend on the mesh topologies of the multi-block meshes on either side of the interface and therefore is applicable to a wide range of applications;
(iv) The zipper mesh generation process is very fast, comparable to that of the multi-block generation time. In terms of memory, little extra memory is required.

The invention provides a powerful capability for high-fidelity CFD mesh generation for complex geometry leading to accurate and efficient solutions for flow problems inside gas turbine engines and other fluid dynamic machines. The invention is also beneficial for other processes requiring computational meshes, such as finite element analysis.

The method extends naturally the current 3D multi-block mesh strategies used intensively in aircraft, engine, automotive, and other machinery flow analysis and design optimisation. The zipper layer is applied at the block interfaces, particularly at the interface between topologically different blocks, and ensures that unstructured cells are only generated when required by the interface mesh. This therefore keeps the unstructured cell count to a minimum which is very advantageous, because unstructured CFD mesh solutions can be more diffusive, especially in the critical flow areas such as boundary layers. Numerical tests indicate that solution accuracy is not compromised by the zipper layer in comparison with the pure multi-block approach.

Physically joining two topologically different multi-block meshes negates the need to interpolate the solution. Interpolation can lead to longer computational runs and greater losses in accuracy of the solution. In addition, the efficiency is also maintained in convergence of the multi-grid iterations.

This method provides design engineers with an automated high-quality mesh generator, which can be easily integrated in the design process. Mesh generation of high quality can be ensured by linking multi-block structured meshes around various product components, e.g. blades and grooves. The accuracy and efficiency of the multi-block structured meshes for complicated geometries can be monitored, and mesh generation time for complex geometries can be shortened.

Specific embodiments have been described, but the skilled reader will readily appreciate that other embodiments and variations, not specifically described herein, are within the scope of the method of the present invention.

Although examples have been described with respect to rotor blade configuration, the Zipper Layer Method is a general methodology, which can be applied to a wide range of applications. For gas turbine engine components it can be used for linking casing treatment to blade mesh; cooling hole or cavity meshes to main engine passage; open rotor mesh to far-field acoustic mesh; flow control devices; and so on. For aircraft applications the method of the present invention is useful for linking wing mesh to pylon/nacelle meshes, landing gear mesh, store carrier, etc., when quality structured meshes are required for accuracy. A wide range of non-aircraft applications can be contemplated, such as marine turbine and wind turbine CFD and finite element analysis.

The invention claimed is:

1. A method of connecting three-dimensional structured meshes to form a conformal mesh, for solutions of flow problems, the method comprising the steps of:
   forming an interface by overlaying surfaces of two structured meshes, each structured mesh comprising hexahedra;
   defining an interface set of mesh points in the interface comprising mesh points from each surface and intersection mesh points formed at the intersection of mesh lines;
   identifying mesh points in the interface set that are within a first predetermined distance of each other and merging them to form merged mesh points, the first predetermined distance is in the range of 5 to 25% of a mesh size of the smaller of the two structured meshes;
   identifying mesh points of one mesh in the interface that are within a second predetermined distance of a line of the other mesh and projecting these mesh points to the corresponding mesh line to form projected mesh points;
   generating an interface layer in the form of an unstructured mesh formed of triangles and quadrilaterals, including the mesh points from each surface, the merged mesh points, the projected mesh points and the intersection mesh points; and
   inserting a node at the center of each hexahedra, and producing an unstructured layer of cells between the two structured meshes by joining the nodes to the mesh points of the interface layer so as to form tetrahedra and pyramids.

2. A method according to claim 1, in which the first predetermined distance can be adjusted by a user.

3. A method according to claim 1, in which the inserted nodes are placed in the geometrical centre of the hexahedra.

4. A method according to claim 1, in which the meshes are multi-block meshes.

5. A method according to claim 1, in which the meshes are topologically different.

6. A method according to claim 1, in which the step of defining the interface set of mesh points employs a dual fast march method to search through the two surface meshes.

7. A method according to claim 1, in which the meshes define a gap between two solid components.

8. A method according to claim 7, in which the gap is much smaller than the dimensions of the components.

9. A method according to claim 7, in which the meshes define the space between components moving with respect to each other.

10. A method according to claim 7, in which the components are a rotor blade and a casing of a gas turbine engine.

11. A method according to claim 1, in which the steps are repeated in order to join a further mesh.

12. A method of analysing computational fluid dynamics of two components comprising the steps of:
    forming a mesh representing each component;
    connecting the meshes using the method according to claim 1; and
    using the connected mesh to analyse the computational fluid dynamics of the components.

13. A method according to claim 12, in which the steps are repeated in order to join a further mesh relating to a further component.

14. A method of performing finite element analysis of two components comprising the steps of:
    forming a mesh representing each component;
    connecting the meshes using the method according to claim 1; and
    using the connected mesh to perform the finite element analysis of the components.

15. A method according to claim 14, in which the steps are repeated in order to join a further mesh relating to a further component.

16. A method of connecting three-dimensional structured meshes to form a conformal mesh, for solutions of flow problems, the method executable on a computer-related medium and comprising the steps of:
    forming an interface by overlaying surfaces of two structured meshes, each structured mesh comprising hexahedra;
    defining an interface set of mesh points in the interface comprising mesh points from each surface and intersection mesh points formed at the intersection of mesh lines;
    identifying mesh points in the interface set that are within a first predetermined distance of each other and merging them to form merged mesh points, the first predetermined distance is in the range of 5 to 25% of a mesh size of the smaller of the two structured meshes;
    identifying mesh points of one mesh in the interface that are within a second predetermined distance of a line of the other mesh and projecting these mesh points to the corresponding mesh line to form projected mesh points;
    generating an interface layer in the form of an unstructured mesh formed of triangles and quadrilaterals, including the mesh points from each surface, the merged mesh points, the projected mesh points and the intersection mesh points; and
    inserting a node at the center of each hexahedra, and producing an unstructured layer of cells between the two structured meshes by joining the nodes to the mesh points of the interface layer so as to form tetrahedra and pyramids.

17. A method according to claim 1, in which the unstructured layer comprises two single layers of intermediate mesh points, one layer on each side of the interface layer.

\* \* \* \* \*